United States Patent
Grant

(10) Patent No.: US 10,909,020 B2
(45) Date of Patent: Feb. 2, 2021

(54) TRACING PROCESSING ACTIVITY

(71) Applicant: ARM LIMITED, Cambridge (GB)

(72) Inventor: Alasdair Grant, Cambridge (GB)

(73) Assignee: ARM Limited, Cambridge (GB)

( * ) Notice: Subject to any disclaimer, the term of this patent is extended or adjusted under 35 U.S.C. 154(b) by 81 days.

(21) Appl. No.: 16/083,640

(22) PCT Filed: Mar. 17, 2017

(86) PCT No.: PCT/GB2017/050750
§ 371 (c)(1),
(2) Date: Sep. 10, 2018

(87) PCT Pub. No.: WO2017/158377
PCT Pub. Date: Sep. 21, 2017

(65) Prior Publication Data
US 2019/0065335 A1 Feb. 28, 2019

(30) Foreign Application Priority Data

Mar. 18, 2016 (GB) .................................. 1604606.2

(51) Int. Cl.
*G06F 11/34* (2006.01)
*G06F 11/30* (2006.01)
*G06F 11/273* (2006.01)

(52) U.S. Cl.
CPC .......... *G06F 11/348* (2013.01); *G06F 11/273* (2013.01); *G06F 11/3024* (2013.01); *G06F 11/3082* (2013.01); *G06F 11/3476* (2013.01)

(58) Field of Classification Search
None
See application file for complete search history.

(56) References Cited

U.S. PATENT DOCUMENTS

| | | | | |
|---|---|---|---|---|
| 7,058,928 B2* | 6/2006 | Wygodny | ........... | G06F 11/3636 714/E11.212 |
| 8,776,029 B2* | 7/2014 | Puthuff | ............... | G06F 11/3612 717/131 |
| 2011/0138124 A1* | 6/2011 | Hill | ..................... | G06F 11/3471 711/122 |
| 2012/0216080 A1* | 8/2012 | Bansal | ................ | G06F 11/3476 714/45 |

(Continued)

OTHER PUBLICATIONS

Anonymous, Adaptive Threshold and Data Protection for Distributed Tracing Systems, 2014, IP.com (Year: 2014).*

(Continued)

*Primary Examiner* — Hossain M Morshed
(74) *Attorney, Agent, or Firm* — Nixon & Vanderhye P.C.

(57) ABSTRACT

Data processing circuitry comprises a processing element configured to perform processing activities; a trace data store; and trace circuitry to generate items of trace data indicative of processing activities of the processing element and to store the items of trace data in the trace data store; the trace circuitry comprising detection circuitry to detect a condition relating to an outcome of a given processing activity for which items of trace data have been stored in the trace data store and to selectively discard at least some of the stored items of trace data relating to the given processing activity in dependence upon the detected condition.

16 Claims, 5 Drawing Sheets

(56) References Cited

U.S. PATENT DOCUMENTS

| | | | | |
|---|---|---|---|---|
| 2012/0246518 A1* | 9/2012 | Francis | ............... | G06F 11/3476 |
| | | | | 714/45 |
| 2013/0091387 A1* | 4/2013 | Bohnet | ............... | G06F 11/3644 |
| | | | | 714/38.1 |
| 2013/0339591 A1* | 12/2013 | Takahashi | ............... | G06F 12/00 |
| | | | | 711/104 |
| 2016/0011922 A1* | 1/2016 | Torino | ................ | G06F 11/0766 |
| | | | | 714/37 |
| 2017/0187587 A1* | 6/2017 | Keppel | ................ | H04L 43/062 |
| 2019/0065335 A1* | 2/2019 | Grant | ................ | G06F 11/3024 |

OTHER PUBLICATIONS

International Search Report for PCT/GB2017/050750 dated Jun. 23, 2017, 2 pages.
Combined Search and Examination Report for GB1604606.2, dated Aug. 25, 2016, 6 pages.
Written Opinion of the ISA for PCT/GB2017/050750, dated Jun. 23, 2017, 7 pages.
Examination Report for GB Application No. 1604606.2, dated May 17, 2019, 6 pages.

\* cited by examiner

TRACING PROCESSING ACTIVITY

This application is the U.S. national phase of International Application No. PCT/GB2017/050750 filed 17 Mar. 2017, which designated the U.S. and claims priority to GB Patent Application No. 1604606.2 filed 18 Mar. 2016, the entire contents of each of which are hereby incorporated by reference.

BACKGROUND

This disclosure relates to tracing processing activity.

There are a number of occasions where it is desirable to keep track of the processing activities being performed by a processing element such as a central processing unit (CPU). For example, such information is useful during the development of data processing apparatus. An example of a tool that may be used to assist in such a process is a tracing tool.

Tracing the activity of a processing element whereby a trace stream is generated that includes data representing the step-by-step activity within the system is therefore a highly useful tool in system development. Such tracing tools use a variety of means for tracing the program flow including embedded trace macrocells (ETM, a trademark of ARM Limited, Cambridge) which are present on the chip whose processing is being monitored. In some instances the trace data is acquired and stored with a timestamp. Examples of these processes include ETM trace, statistical profiling and embedded logic analysis.

These tracing tools can be used to reconstruct the state of a machine at a certain point during execution of the instruction stream. They are relevant to detecting or diagnosing problems or other abnormal machine behaviour during execution of the instruction stream.

SUMMARY

In an example arrangement there is provided data processing circuitry comprising a processing element configured to perform processing activities; a trace data store; and trace circuitry to generate items of trace data indicative of processing activities of the processing element and to store the items of trace data in the trace data store; the trace circuitry comprising detection circuitry to detect a condition relating to an outcome of a given processing activity for which items of trace data have been stored in the trace data store and to selectively discard at least some of the stored items of trace data relating to the given processing activity in dependence upon the detected condition.

In another example arrangement there is provided trace apparatus comprising: trace circuitry to generate items of trace data indicative of processing activities of a processing element and to store the items of trace data in a trace data store; the trace circuitry comprising detection circuitry to detect a condition relating to an outcome of a given processing activity for which items of trace data have been stored in the trace data store and to selectively discard at least some of the stored items of trace data relating to the given processing activity in dependence upon the detected condition.

In another example arrangement there is provided data processing circuitry comprising processing means for performing processing activities; means for storing trace data; and trace means for generating items of trace data indicative of processing activities of the processing means and for storing the items of trace data in the storing means; the trace means comprising detecting means for detecting a condition relating to an outcome of a given processing activity for which items of trace data have been stored in the storing means and for selectively discarding at least some of the stored items of trace data relating to the given processing activity in dependence upon the detected condition.

In another example arrangement there is provided trace apparatus comprising: trace means for generating items of trace data indicative of processing activities of the processing means and for storing the items of trace data in the storing means; the trace means comprising detecting means for detecting a condition relating to an outcome of a given processing activity for which items of trace data have been stored in the storing means and for selectively discarding at least some of the stored items of trace data relating to the given processing activity in dependence upon the detected condition.

In another example arrangement there is provided a method comprising: generating items of trace data indicative of processing activities of a processing element; storing the items of trace data in a trace data store; detecting a condition relating to an outcome of a given processing activity for which items of trace data have been stored in the trace data store; and selectively discarding at least some of the stored items of trace data relating to the given processing activity in dependence upon the detected condition.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
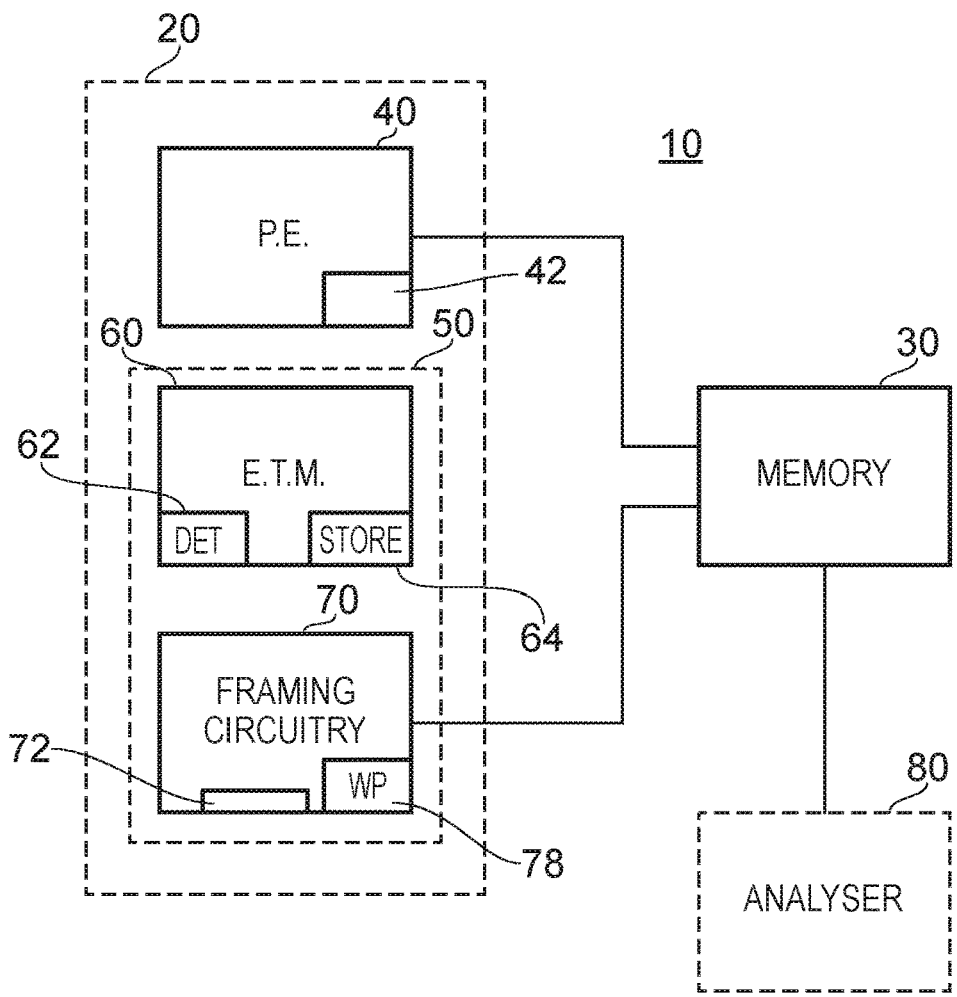
FIG. 1 schematically illustrates a data processing apparatus.

Before discussing the embodiments with reference to the accompanying figures, the following description of embodiments is provided.

An example embodiment provides data processing circuitry comprising: a processing element configured to perform processing activities; a trace data store; and trace circuitry to generate items of trace data indicative of processing activities of the processing element and to store the items of trace data in the trace data store; the trace circuitry comprising detection circuitry to detect a condition relating to an outcome of a given processing activity for which items of trace data have been stored in the trace data store and to selectively discard at least some of the stored items of trace data relating to the given processing activity in dependence upon the detected condition.

The present techniques recognise that in a system in which trace data is collected and stored, the volume of data involved can be very large. This can lead to issues with the storage space occupied by the data and the processing needed to retrieve and handle the data. The techniques also recognise that sometimes it is not known, until after the trace data has been acquired and stored, whether the trace data is useful. Here, the term "useful" could (for example) indicate that the trace data is relevant to a fault or abnormal operating condition. In these circumstances, the present disclosure provides an arrangement in which the trace data in respect of a given processing activity is stored but then the question of whether or not to subsequently discard the trace data relating to the given processing activity is predicated or dependent upon detection of a condition relating to an outcome of the given processing activity. For example if the given processing activity completes its operation successfully and/or in a timely manner, at least some of the trace data relating to that given processing activity may be discarded. If the detection indicates that the given processing activity has not completed its operation successfully and/or in a timely manner, the trace data can be retained (not discarded). In this way, in examples, trace data can be recorded in case a processing activity operates abnormally, but retained only if a subsequent detection indicates such abnormal behaviour.

Embodiments of the disclosure can therefore provide for the storage of trace data which is relevant to processing activities which have an outcome meeting one or more certain conditions, but the discarding of other trace data. These measures can alleviate the problems discussed above.

In examples, the trace data store is a buffer having an associated order of data item storage and an indicator to indicate a next available storage position, in the order of data item storage; and the detection circuitry is configured to discard stored items of trace data relating to the given processing activity by setting the indicator to indicate, as a next available storage position, a storage position in the trace data store at which an item of trace data relating to the given processing activity is stored. So, for example, stored trace data can be discarded by moving the indicator (for example, a write pointer) back to a position within the stored trace data. While this might not immediately overwrite the discarded trace data, it means that the discarded trace data will be overwritten by trace data stored next.

It is possible to retain some of the trace data relating to a processing activity for which a "discard" outcome has been detected. For example, a first or header portion of the trace data could be retained, for example in order to indicate to later analysis that the given processing activity completed successfully such that no further trace data was retained. To achieve this, the indicator or write pointer could be returned (as part of the discarding process) to a position within the stored trace data for the given activity, other than a first position (in the order of data item storage). However, in other examples, the detection circuitry is configured to discard all of the stored items of trace data relating to the given processing activity by setting the indicator to indicate, as a next available storage position, a first storage position in the order of data item storage at which an item of trace data relating to the given processing activity is stored.

In examples, the detection circuitry is configured to store, in response to initiation of a processing activity, a current state of the indicator. This can allow the indicator to be returned to that stored state (ready for storage of trace data for a next processing activity) in response to the detection circuitry discarding the stored trace data for the given processing activity. In some examples, the detection circuitry is configured to discard all the stored items of data trace relating to the given processing activity by setting the indicator to indicate, as a next available storage position, the indicator value stored in response to initiation of the given processing activity.

The trace data store may be a circular buffer in which, when the indicator reaches a limit position in the order of data item storage, the indicator is adjusted so that a next available storage position is a preceding position in the order of data item storage. In some examples, the limit position is a last storage position in the trace data store so that trace data relating to a processing activity can occupy space up to the end of the buffer before the circular buffer wraps around to the preceding position. In other examples, however, the limit position is no more than a limit number of storage positions, in the order of data item storage, from a first storage position at which an item of trace data relating to the given processing activity is stored. In these examples, the amount of buffer space which can be occupied by trace data relating to an individual processing activity is capped at the limit number of storage positions. This can avoid the buffer being excessively filled by trace data relating to an individual processing activity.

In terms of the wrap around operation of such a circular buffer, in some examples the preceding position (which the indicator returns to in response to reaching the limit position) can be the start of the buffer in the order of data item storage. However, in other examples, the preceding position (which the indicator returns to in response to reaching the limit position) is a first available storage position after, in the order of data item storage, stored items of trace data which were not discarded by the detection circuitry. In this way, previously stored and not-discarded trace data is retained while still allowing operation as a circular buffer. In examples, the circular buffer simply gets smaller as more and more trace data is retained (not discarded).

Various conditions relating to the outcome of the given data processing operation may be detected. In examples, the detection circuitry is configured to detect, as a condition, a period since initiation of the given processing activity. For example, the detection circuitry may be configured to discard stored items of trace data relating to the given processing activity when the period since initiation of the given processing activity is less than a threshold period when the given processing activity reaches a predetermined stage. Here, a processing activity which takes longer than the threshold period has its trace data not discarded, whereas a processing activity which takes less than the threshold period has its trace data discarded. In this way, for example by setting the threshold period at (or just above) a normal processing time for the given processing activity, processing activities which are abnormally slow can have their trace data retained, for example so that a cause of the slow operation can be investigated. The "period" could be expressed in terms of time, processing clock cycles or another measure. The predetermined stage may be completion of the given processing activity. An example of such a processing activity to which this arrangement is suited is the handling of a processor interrupt.

In other examples, the detection circuitry is configured to discard stored items of trace data relating to the given processing activity in response to a detection of successful completion of the given processing activity. This provides for the retention of trace data in respect of processing activities which did not successfully complete.

In some examples, the processing element is configured to execute program instructions; and the processing activities relate to the execution of groups of program instructions. However, the techniques for generating and storing trace data do not necessarily apply only to the execution of data processing instructions. In some other examples, the processing element comprises logic circuitry to execute logical operations; and the processing activities relate to the execution of one or more logical operations. In some other examples, the processing element comprises circuitry to transfer data from a source to a destination; and the processing activities relate to data transfer operations.

Another example embodiment provides trace apparatus comprising: trace circuitry to generate items of trace data indicative of processing activities of a processing element and to store the items of trace data in a trace data store; the trace circuitry comprising detection circuitry to detect a condition relating to an outcome of a given processing activity for which items of trace data have been stored in the trace data store and to selectively discard at least some of the stored items of trace data relating to the given processing activity in dependence upon the detected condition.

Another example embodiment provides data processing circuitry comprising: processing means for performing processing activities; means for storing trace data; and trace means for generating items of trace data indicative of processing activities of the processing means and for storing the items of trace data in the storing means; the trace means comprising detecting means for detecting a condition relating to an outcome of a given processing activity for which items of trace data have been stored in the storing means and for selectively discarding at least some of the stored items of trace data relating to the given processing activity in dependence upon the detected condition.

Another example embodiment provides trace apparatus comprising: trace means for generating items of trace data indicative of processing activities of the processing means and for storing the items of trace data in the storing means; the trace means comprising detecting means for detecting a condition relating to an outcome of a given processing activity for which items of trace data have been stored in the storing means and for selectively discarding at least some of the stored items of trace data relating to the given processing activity in dependence upon the detected condition.

Another example embodiment provides a method comprising: generating items of trace data indicative of processing activities of a processing element; storing the items of trace data in a trace data store; detecting a condition relating to an outcome of a given processing activity for which items of trace data have been stored in the trace data store; and selectively discarding at least some of the stored items of trace data relating to the given processing activity in dependence upon the detected condition.

Referring now to the drawings, FIG. 1 schematically illustrates a data processing apparatus or circuitry 10 comprising a processor 20 connected to a memory 30. The arrangement of FIG. 1 (or at least the processor 20) may be implemented as a single integrated circuit or a part of a single integrated circuit.

The processor 20 comprises a processing element (such as a central processing unit or CPU) 30 which can access the memory 30 (for example, by way of a cache memory, not shown) and a trace apparatus 50 in the form of an embedded trace macrocell (ETM) 60 and framing circuitry 70. Optionally, trace circuitry 42 can be provided within the processing element 40, cooperating with the trace apparatus 50 to carry out the functions of the trace apparatus. The trace apparatus is configured to generate and store items of trace data indicative of processing activities of the processing element.

The processing element 40 executes a stream of instructions, as an example of a processing element configured to perform processing activities.

The trace apparatus comprises trace circuitry to generate items of trace data indicative of processing activities of a processing element and to store the items of trace data in a trace data store. For example the trace data may indicate the nature or identity of instructions executed by the processing element, data values acted upon and/or generated by the execution of those instructions, the state of one or more processor registers, the state and progress of data transfers and the like. These items of trace data are generated in response to the activities of the processing element, or in other words contemporaneously with the processing activities.

Although the ETM 60 could comprise its own storage for trace data, in the present example the memory 30 acts as the trace data store. Items of trace data generated by the ETM 60 may be in the form of individual bytes or words and are collated by the framing circuitry 70 into groups or frames of, for example, 16 bytes before being written out to the memory 30. Therefore, the memory 30 provides an example of a trace data store.

Using techniques that will be described in more detail below, the trace circuitry comprises detection circuitry 62 to detect a condition relating to an outcome of a given processing activity for which items of trace data have been stored in the trace data store and to selectively discard at least some of the stored items of trace data relating to the given processing activity in dependence upon the detected condition.

Optionally, a trace data analyser 80 can access the stored trace data in the memory 30, for example as a post-process applied after the processing activities for which the trace data is generated and stored, to analyse the stored trace data.

Figure 2:
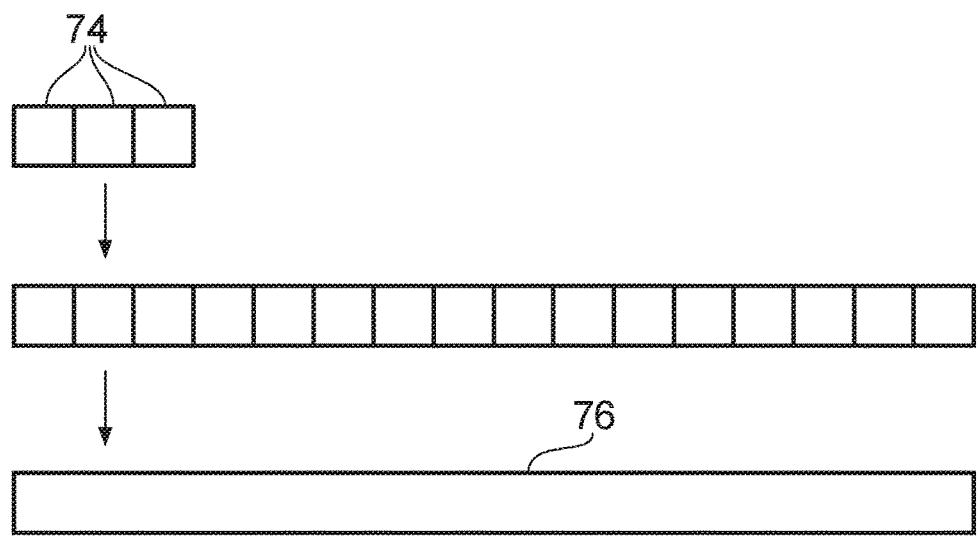
FIG. 2 schematically illustrates a framing operation.

FIG. 2 schematically illustrates a framing operation. As mentioned above, in examples the framing circuitry assembles groups, frames or packets of a particular number of bytes or words, for example 16 bytes of trace data. As each item of trace data is generated by the ETM 60, it is added to a buffer 72 (such as a 16 byte buffer, or in other examples a buffer equal in size to 15 bytes+the maximum possible size in bytes of an item of trace data). When the buffer reaches an occupancy of at least 16 bytes, a 16 byte frame or packet is written by the framing circuitry 70 to the memory 30 and the buffer starts to refill again.

Referring to FIG. 2, an upper row schematically shows three bytes 74 of trace data already assembled in the buffer 72. A middle row schematically represents a later situation at which 16 bytes of trace data have assembled in the buffer 72, in response to which the framing circuitry outputs a 16 byte packet or frame 76 to the memory 30. An area of the memory 30 can be reserved or otherwise allocated for use as the trace data store.

It will be appreciated that other packet or frame sizes could be used.

Figure 3:
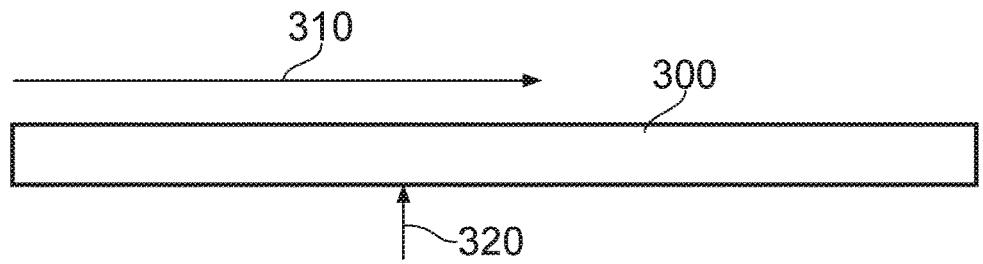
FIG. 3 schematically illustrates a trace data buffer.

FIG. 3 schematically illustrates a trace data store implemented as a region or area 300 of the memory 30. The trace data store is referred to as a buffer because of the way that—in normal operation—trace data items are written to the trace data buffer by the trace circuitry 50 and are read from the trace data buffer by the analyser 80.

As described above, data items are written to the trace data store in frames by the framing circuitry 70. They are written in a frame-by-frame order corresponding to an order of data item storage. But considering the combination of the trace data store provided by the memory 30 and the buffer 72, the two in cooperation provide a data-item-by-data-item order of data item storage, in that the trace data store in the memory 30 provides a frame-by-frame writing order and a "next frame to be written" position or pointer, and the buffer 72 provides a byte-by-byte writing order and a "next byte to be written" pointer 78. The combination of these two pointers can provide an implementation of an indicator or write pointer indicating a next data item position in the data item storage order.

The combination of the two buffers provides an example of a trace data store arranged as a buffer having an associated order of data item storage (as shown schematically by an arrow 310) and an indicator or write pointer 320 to indicate a next available storage position, in the order of data item storage. Using these techniques, a newly generated trace data item will be stored at a next position in the buffer 72 until a frame is complete, at which point the frame will be written at a next frame position in the memory 30. Therefore, the fact that the buffer 72 is used provides convenience in that the number of accesses to the memory 30 is reduced, but in other respects the buffer 72 and the trace data store 300 in the memory 30 cooperate together to provide the function of a byte-by-byte buffer having a writing order and a write pointer or indicator to indicate a next writing position.

In examples, and using techniques to be described further below, the detection circuitry is configured to discard stored items of trace data relating to the given processing activity by setting the indicator 320 to indicate, as a next available storage position, a storage position in the trace data store at which an item of trace data relating to the given processing activity is stored. In this way, although trace data to be discarded is not necessarily deleted from the trace data store, the write pointer is set so that it will be overwritten as the next-generated trace data is written to the trace data store.

Figure 4:
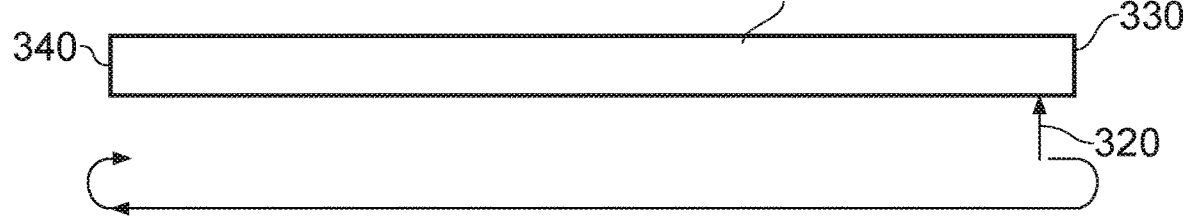
FIG. 4 schematically illustrates a circular trace data buffer.

FIG. 4 schematically illustrates a circular trace data buffer in which, when the indicator or write pointer 320 reaches a limit position in the order of data item storage, the indicator is adjusted so that a next available storage position is a preceding position in the order of data item storage. For example, the limit position may be a last storage position 330 in the trace data store and the preceding position may be a first storage position in the trace data store (both with respect to the order of data item storage). In this way, when the trace data store becomes full, writing returns to a preceding position in the trace data store, overwriting earlier-stored trace data.

In either example (FIG. 3 or FIG. 4), the framing circuitry 30 or another part of the trace circuitry 50 can be arranged to respond to the indicator or write pointer reaching the last position 330 by issuing a message or command to the analyser 80 to retrieve the stored trace data from the trace data store.

Figure 5:
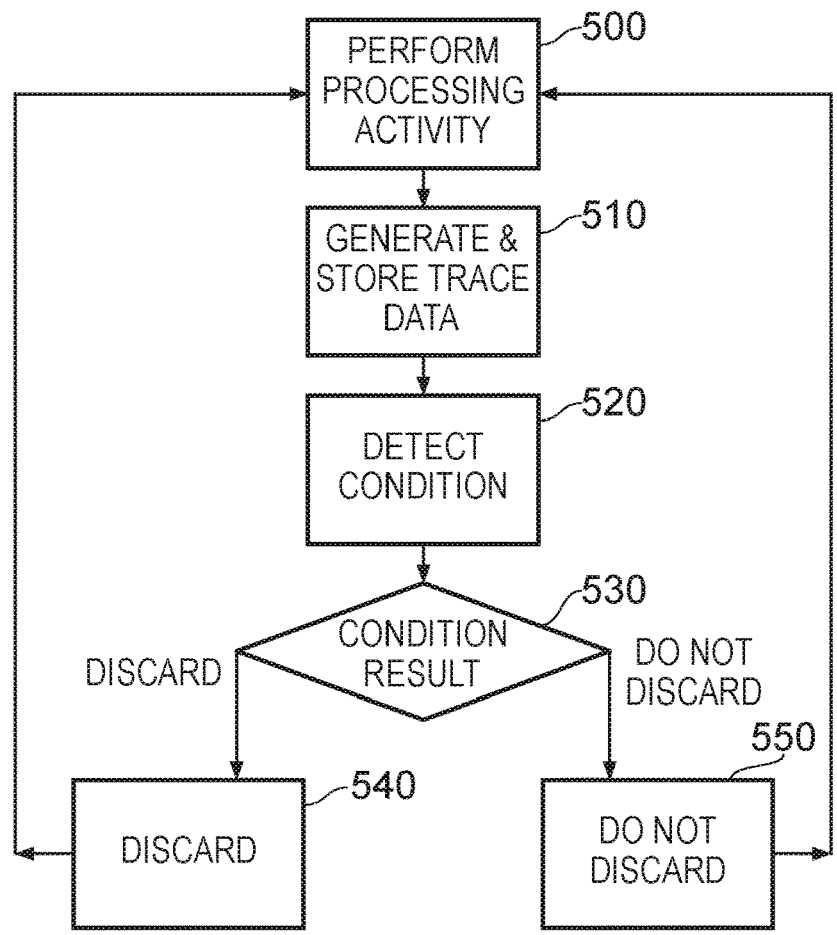
FIG. 5 is a schematic flowchart illustrating a data processing method.

FIG. 5 is a schematic flowchart illustrating a data processing method.

At a step 500, the processing element 40 performs processing activities, for example a particular current (or "given") processing activity.

A step 510 involves the circuitry 50 generating items of trace data indicative of processing activities of the processing element and storing the items of trace data in a trace data store (the buffer 72 and the memory area 300, cooperating together as discussed above).

In examples, the steps 500, 510 operate so that trace data is not continuously stored but rather the storage of trace data for a processing activity starts in response to initiation of that processing activity. So, the processing activity can, in examples, be considered as a task or item of work to be done, which has a start and (at least under normal circumstances) an end. The start of the processing activity provides a trigger to start the saving of trace data. Example processing activities include handling a processor interrupt. Here, the interrupt can act both as the initiation of the processing activity and the trigger event (to trigger the saving of trace data). Or, the detection, by the ETM 60 of the element 40 handling an interrupt (or an interrupt of a particular type) can form the trigger event. So, although the generation of trace data might be a continuous process or might start in response to the trigger, the saving of the trace data is, in examples, initiated by the trigger event which can be the start of the particular processing activity. The ETM 60 may maintain a schedule or list of types of processing activities which, when initiated, trigger the saving of trace data. The processing activities can themselves trigger the saving of trace data, or a detection by the ETM 60 of the start of that processing activity can trigger the saving of trace data.

A step 520 involves detecting a condition relating to an outcome of a given processing activity for which items of trace data have been stored in the trace data store. Examples of such a detection will be discussed below.

A step 530 involves selectively discarding 540 (or not discarding 550) at least some of the stored items of trace data relating to the given processing activity in dependence upon the detected condition.

Figure 6:
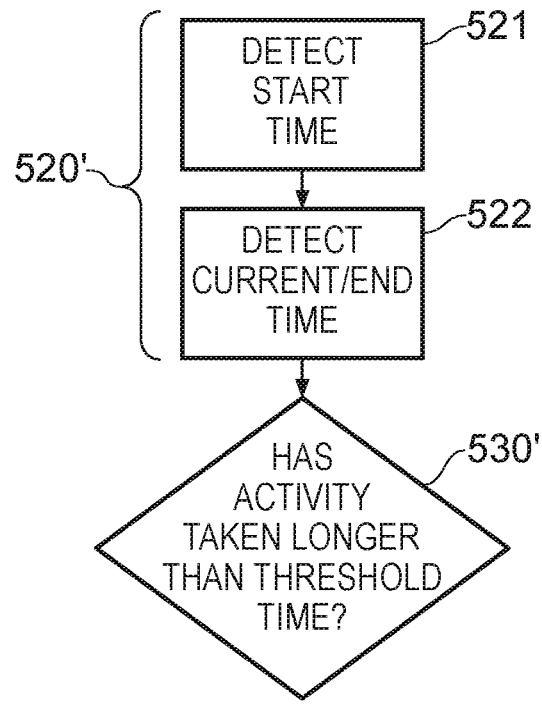
FIGS. 6 and 7 schematically illustrate respective examples of selected steps of FIG. 5.
Figure 7:
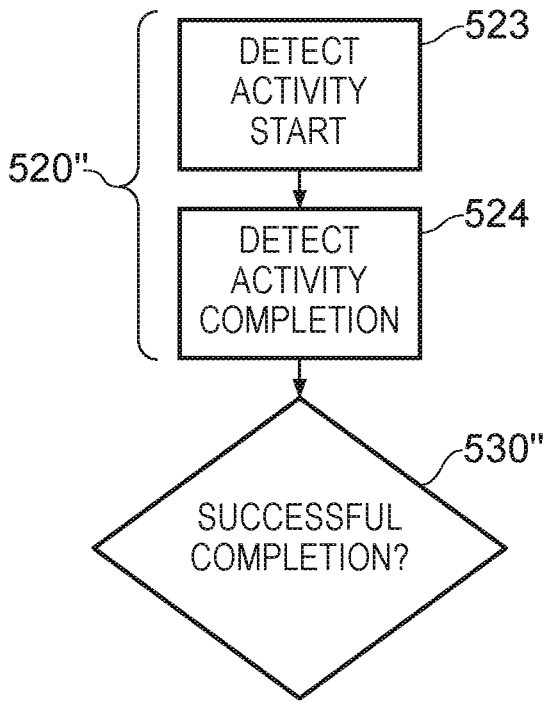
Figure 8:
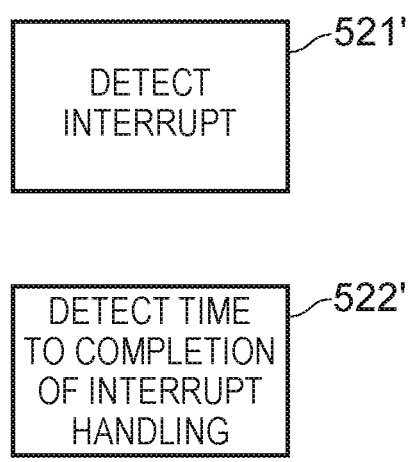
FIG. 8 schematically illustrates example steps relating to execution of interrupt handling.

FIGS. 6 and 7 schematically illustrate respective examples of selected steps of FIG. 5. In each case, example versions (520', 520") of the step 520 are illustrated, and in each case example versions (530', 530") of the step 530 are illustrated.

In FIG. 6, the detection circuitry is configured as the step 520' to detect, as a condition, a period since initiation of the given processing activity. For example, this can be performed by detecting 521 a start time (in units of time, or clock cycles for example. Also the start time could be defined at each instance of the step 521 as "zero", with elapsed time then counting upwards from there). A step 522 involves detecting a current or end time. For example, the current time could be detected and (as discussed below) if it is beyond a threshold period since the start time, abnormal behaviour (and a reason not to discard the saved trace data) could be detected. This could be performed whether or not the processing activity has finished. As an alternative, the time at the end or completion of the processing activity, or at a predetermined stage within the processing activity, is detected and the period since the start time detected. Again, if this exceeds a threshold period, abnormal behaviour (and a reason not to discard the saved trace data) could be detected as a result. At the step 530', if either type of detection leads to the conclusion that the activity has taken longer than the threshold period (whether or not the activity has completed), then the saved trace data are not discarded. Otherwise, if the activity has completed and took less than the threshold time, the saved trace data are discarded. This provides an example of the detection circuitry discarding stored items of trace data relating to the given processing activity when the period since initiation of the given processing activity is less than a threshold period when the given processing activity reaches a predetermined stage.

FIG. 7 relates to a detection of whether the activity has completed. The step 520" is provided by steps 523 and 524. At the step 523, the start of an activity is detected (though this might be implicit in the whole process, given that trace data in FIG. 5 is generated and stored for a processing activity, which is to say, an activity which has started). Activity completion is detected at the step 524. At the step 530" a detection of successful completion indicates that the stored trace data should be discarded; a lack of successful completion indicates that the trace data should not be discarded. This provides an example of the detection circuitry discarding stored items of trace data relating to the given processing activity in response to a detection of successful completion of the given processing activity. Therefore, in examples, the predetermined stage is completion of the given processing activity.

As a particular example of FIG. 6, the steps 521', 522' take the place of the steps 521, 522. At the step 521' the time at which a processor interrupt is initiated is detected. At the step 522', the time period to completion of handling the interrupt is detected. A time to completion which is longer than a threshold period indicates that the trace data relating to the handling of that interrupt should not be discarded.

Figure 9:
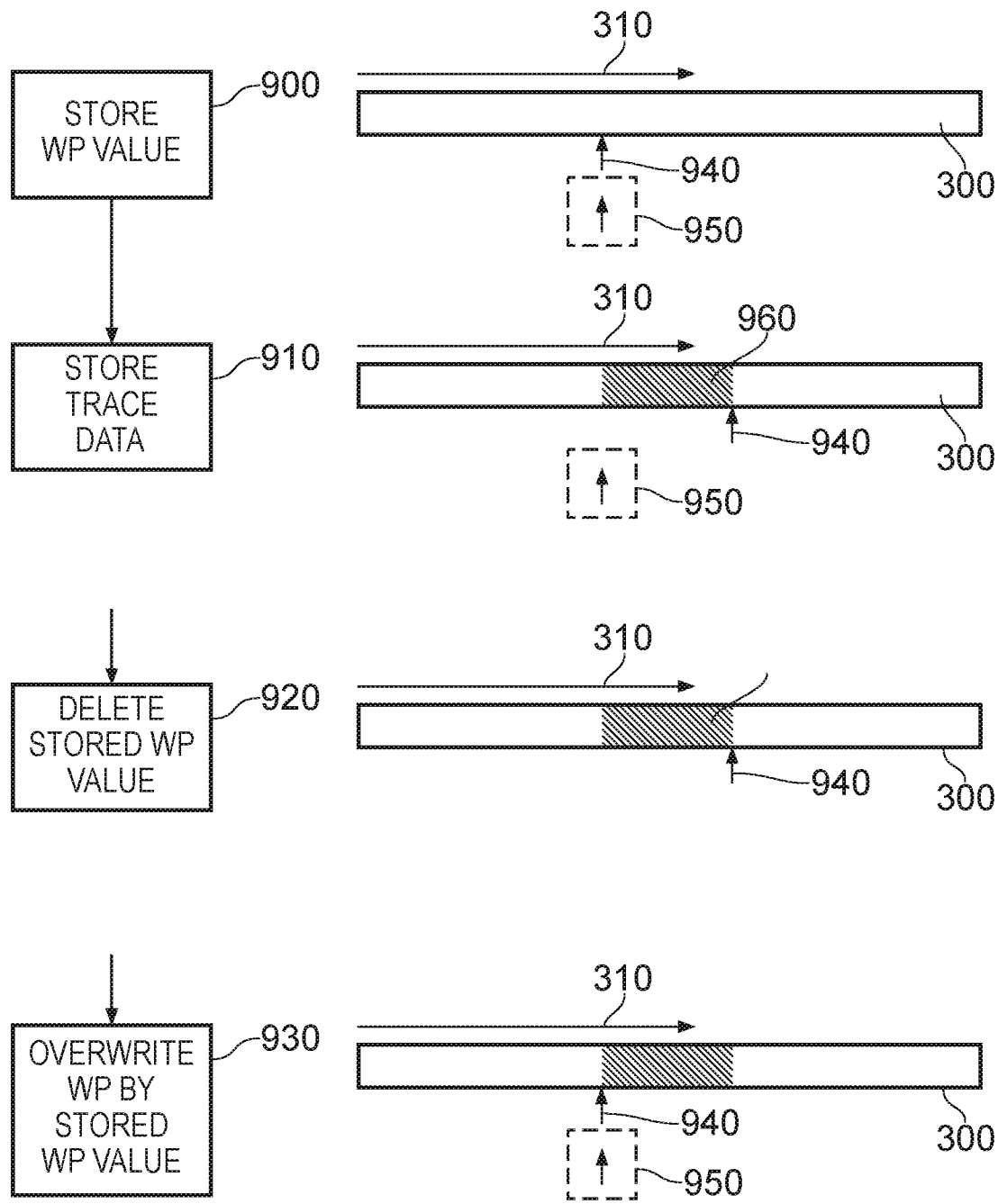
FIG. 9 schematically illustrates the storing and discarding of stored trace data.

FIG. 9 schematically illustrates the storing and discarding of stored trace data. Alongside four process steps 900 . . . 930 in FIG. 9, respective schematic representations of occupancy of the trace data store are indicated.

In FIG. 9, the steps 900, 910 correspond to at least a part of the functionality of the step 510 of FIG. 5. At the step 900, the current state of the indicator or write pointer (WP) 940 is stored, providing an example of the detection circuitry being configured to store, in response to initiation of a processing activity, a current state of the indicator. For example, a store 64 can be used to store the WP value. Note that, as discussed above, the WP can be provided as a composite of a byte pointer 78 relating to the buffer 72 and a frame pointer relating to the memory 30. These are shown as a single byte-specific pointer 940 in FIG. 9, with a stored current value being drawn in a broken line box 950.

Then, at the step 910, the trace data is stored, starting at the initial WP position, in the data item storage order 310. Stored trace data relating to the current processing activity is shown schematically by a shaded box 960. The WP is then at the next data item position after the stored trace data 960.

A step 920 corresponds to the step 550 of FIG. 5. To retain (not discard) the stored trace data corresponding to an activity, the stored WP value 950 is deleted and the WP remains at its latest position.

A step 930 corresponds to the step 540 of FIG. 5. To discard the stored trace data, the WP 940 is overwritten by the stored WP value 950. This can leave the recently stored trace data 960 still in the trace data store, but at a position relative to the WP 940 such that it will be overwritten by the next stored trace data. The step 930 provides an example of the detection circuitry being configured to discard all of the stored items of trace data relating to the given processing activity by setting the indicator to indicate, as a next available storage position, a first storage position in the order of data item storage at which an item of trace data relating to the given processing activity is stored. More specifically, the step 930 provides an example of the detection circuitry being configured to discard all the stored items of data trace relating to the given processing activity by setting the indicator to indicate, as a next available storage position, the indicator value stored in response to initiation of the given processing activity.

In alternative arrangements it may be that not all of the trace data stored in respect of a given processing activity is in fact discarded. For example, the trace data may have a format which includes an initial data item or header indicating the nature of the processing activity (such as "the trace data which follows relates to the handling of an interrupt of type X"), which is then followed—in the storage order—by trace data relating to the handling of that interrupt. In the event that the trace data is discarded, it is of course a possibility to discard all of the trace data including the initial or header portion. In other examples, however, it could be useful to retain the initial or header portion but discard the remaining trace data. This can indicate to the analyser 80 that an interrupt of type X was (for example) successfully and/or timely handled, because the presence of the initial or header portion with no corresponding following trace data implies or indicates that the subsequent trace data was discarded because the outcome of the condition detection indicated to do so. Overall, this can provide an indication to the analyser 80 of the number or volume of successfully and/or timely handled occurrences amongst the "abnormal" occurrences for which trace data was retained. In terms of possible implementations, the storage of the WP 940 as the stored value 950 (the step 900 in FIG. 9) could be arranged to take place after the writing of the initial or header portion of the trace data, which then allows the remainder of the process of FIG. 9 to proceed as described above. Alternatively, the writing back of the WP at the step 930 could in fact write back "stored WP+1" (or more generally, "stored WP+size of header portion").

Figure 10:
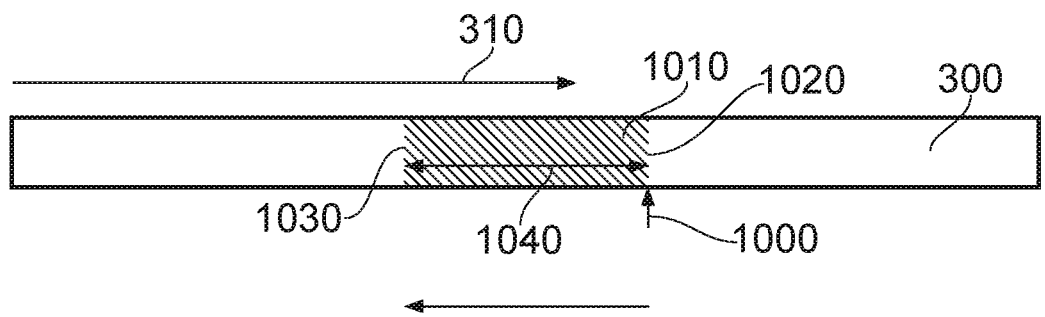
FIGS. 10 and 11 schematically illustrate circular buffer techniques relating to trace data.
Figure 11:
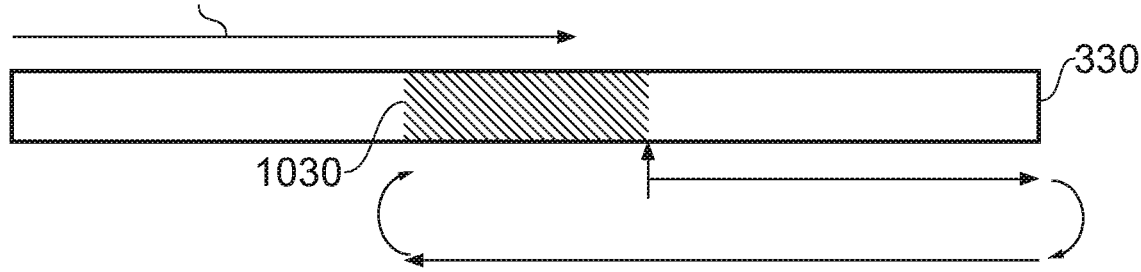

FIGS. 10 and 11 schematically illustrate example circular buffer techniques relating to trace data. These are variants on the circular buffer described with reference to FIG. 4 above.

In both of FIGS. 10 and 11, the "preceding position" to which the circular buffer wraps round is in fact a position corresponding to the first data item position 1030 (in the order 310) after the last-stored non-discarded trace data item for a preceding processing activity. So, the buffer is a circular one which effectively decreases in size as each non-discarded set of processing activity trace data is stored and retained. Therefore, in these examples, preceding position is a first available storage position after, in the order of data item storage, stored items of trace data which were not discarded by the detection circuitry.

In FIG. 10, the "limit position" at which the buffer wraps around is not defined as the last position in the entire trace data store (in the order 310) but is set to be no more than a limit number of storage positions 1040 from the position 1030. So, as trace data 1010 is stored and reaches a data item position corresponding to the limit number (or the end of the buffer, if sooner), the buffer wraps back to the position 1030. This limits the amount of buffer occupancy taken up by trace data relating to any individual processing activity. Therefore, in this example, the limit position is no more than a limit number of storage positions, in the order of data item storage, from a first storage position at which an item of trace data relating to the given processing activity is stored.

In an alternative arrangement shown in FIG. 11, the limit position is the end of the buffer (the last storage position 330 in the order 310).

Figures 12, 13:
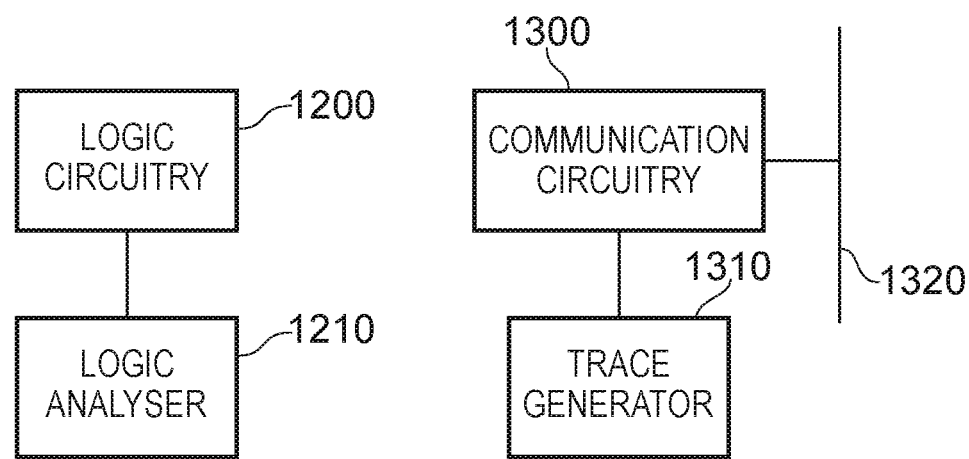
FIGS. 12 and 13 provide schematic examples of other data processing apparatus.

As discussed, in the example of FIG. 1, the processing element is configured to execute program instructions; and the processing activities relate to the execution of groups of program instructions. However, the present techniques are applicable to other examples, and FIGS. 12 and 13 provide schematic examples of other data processing apparatus. Parts already described with reference to FIG. 1 are not shown again. The respective arrangements of FIGS. 12 and 13 may be implemented as a single integrated circuit or a part of a single integrated circuit.

In the example of FIG. 12, the processing element comprises logic circuitry 1200 to execute logical operations; the ETM is replaced by logic analyser circuitry (for example, an on-chip logic analyser) 1210 with an associated memory (not shown) and the processing activities relate to the execution of one or more logical operations.

In the example of FIG. 13, the processing element comprises communication circuitry 1300 to transfer data (via a data link shown schematically as 1320) from a source to a destination (one of which may be the circuitry 1300, or both may be other nodes, not shown), and the processing activities relate to data transfer operations. The ETM is replaced by a trace generator 1310 with an associated memory.

Figure 14:
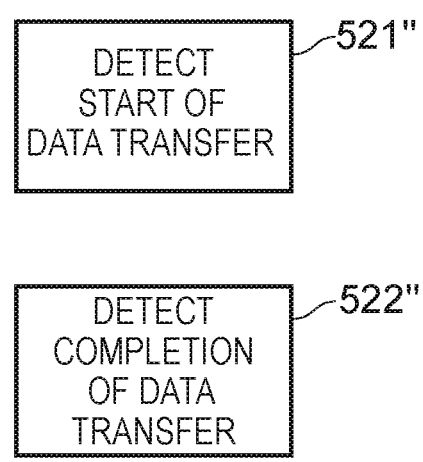
FIG. 14 schematically illustrates example steps relating to execution of a data transfer operation.

FIG. 14 schematically illustrates example steps relating to execution of a data transfer operation in the example of FIG. 13. Steps 521", 522" replace the steps 521, 522 in FIG. 6. At the step 521" the time at which a data transfer such a bus transfer is initiated is detected. At the step 522", the time period to completion of handling the data transfer is detected. A time to completion which is longer than a threshold period indicates that the trace data relating to the handling of that interrupt should not be discarded.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as the processing element 12) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Data processing circuitry comprising:
a processing element configured to perform processing activities;
a trace data store; and
trace circuitry to:
generate items of trace data indicative of processing activities of the processing element, each item of trace data comprising a header indicative of a nature of a corresponding processing activity, and
store the items of trace data in the trace data store;
the trace circuitry comprising detection circuitry to:
detect a condition relating to an outcome of a given processing activity for which items of trace data have been stored in the trace data store, said condition being a period since initiation of the given processing activity, and
selectively discard at least some of the stored items of trace data relating to the given processing activity, and retain the header of each discarded item of trace data, in dependence upon the period since initiation of the given processing activity being less than a threshold period when the given processing activity reaches a predetermined stage.

2. Data processing circuitry according to claim 1, in which:
the trace data store is a buffer having an associated order of data item storage and an indicator to indicate a next available storage position, in the order of data item storage; and
the detection circuitry is configured to discard stored items of trace data relating to the given processing activity by setting the indicator to indicate, as a next available storage position, a storage position in the trace data store at which an item of trace data relating to the given processing activity is stored.

3. Data processing circuitry according to claim 2, in which:
the detection circuitry is configured to discard all of the stored items of trace data relating to the given processing activity by setting the indicator to indicate, as a next available storage position, a first storage position in the order of data item storage at which an item of trace data relating to the given processing activity is stored.

4. Data processing circuitry according to claim 2, in which the detection circuitry is configured to store, in response to initiation of a processing activity, a current state of the indicator.

5. Data processing circuitry according to claim 4, in which the detection circuitry is configured to discard all the stored items of data trace relating to the given processing activity by setting the indicator to indicate, as a next available storage position, the indicator value stored in response to initiation of the given processing activity.

6. Data processing circuitry according to claim 2, in which the trace data store is a circular buffer in which, when the indicator reaches a limit position in the order of data item storage, the indicator is adjusted so that a next available storage position is a preceding position in the order of data item storage.

7. Data processing circuitry according to claim 6, in which the limit position is a last storage position in the trace data store.

8. Data processing circuitry according to claim 6, in which the limit position is no more than a limit number of storage positions, in the order of data item storage, from a first storage position at which an item of trace data relating to the given processing activity is stored.

9. Data processing circuitry according to claim 6, in which the preceding position is a first available storage position after, in the order of data item storage, stored items of trace data which were not discarded by the detection circuitry.

10. Data processing circuitry according to claim 1, in which the predetermined stage is completion of the given processing activity.

11. Data processing circuitry according to claim 1, in which the detection circuitry is configured to discard stored items of trace data relating to the given processing activity in response to a detection of successful completion of the given processing activity.

12. Data processing circuitry according to claim 1, in which:
the processing element is configured to execute program instructions; and
the processing activities relate to the execution of groups of program instructions.

13. Data processing circuitry according to claim 1, in which:
the processing element comprises logic circuitry to execute logical operations; and
the processing activities relate to the execution of one or more logical operations.

14. Data processing circuitry according to claim 1, in which:
the processing element comprises circuitry to transfer data from a source to a destination; and
the processing activities relate to data transfer operations.

15. Trace apparatus comprising:
trace circuitry to:
generate items of trace data indicative of processing activities of a processing element, each said item of trace data comprising a header indicative of a nature of a corresponding processing activity, and
store the items of trace data in a trace data store;
the trace circuitry comprising detection circuitry to:
detect a condition relating to an outcome of a given processing activity for which items of trace data have been stored in the trace data store, said condition being a period since initiation of the given processing activity, and
selectively discard at least some of the stored items of trace data relating to the given processing activity, and retain the header of each discarded item of trace data, in dependence upon the period since initiation of the given processing activity being less than a threshold period when the given processing activity reaches a predetermined stage.

16. A method comprising:
generating items of trace data indicative of processing activities of a processing element, each said item of trace data comprising a header indicative of a nature of a corresponding processing activity;
storing the items of trace data in a trace data store;
detecting a condition relating to an outcome of a given processing activity for which items of trace data have been stored in the trace data store, said condition being a period since initiation of the given processing activity; and
selectively discarding at least some of the stored items of trace data relating to the given processing activity, and retaining the header of each discarded item of trace data, in dependence upon the period since initiation of the given processing activity being less than a threshold period when the given processing activity reaches a predetermined stage.

\* \* \* \* \*